(12) United States Patent
Wexler

(10) Patent No.: US 7,703,419 B1
(45) Date of Patent: Apr. 27, 2010

(54) ANIMAL TOE NAIL COVERING AND METHOD OF MANUFACTURE

(76) Inventor: Toby Wexler, 303 Paddington Dr., Lafayette, LA (US) 70508

(*) Notice: Subject to any disclaimer, the term of this patent is extended or adjusted under 35 U.S.C. 154(b) by 767 days.

(21) Appl. No.: 10/824,889

(22) Filed: Apr. 14, 2004

(51) Int. Cl.
*A01K 13/00* (2006.01)

(52) U.S. Cl. ..................................................... 119/851

(58) Field of Classification Search ......... 119/850–851; D30/146; 54/82; 132/73, 200
See application file for complete search history.

(56) References Cited

U.S. PATENT DOCUMENTS

| | | | | |
|---|---|---|---|---|
| 2,028,674 A | * | 1/1936 | Larson | 119/851 |
| 2,285,981 A | * | 6/1942 | Johns | 2/21 |
| 4,908,881 A | * | 3/1990 | Field | 2/21 |
| 4,962,731 A | | 10/1990 | Wexler | |
| 6,367,425 B1 | * | 4/2002 | Irizzary | 119/851 |
| 6,659,047 B2 | | 12/2003 | Gat | |

OTHER PUBLICATIONS

Merriam-Webster's Collegiate Dictionary Tenth Edition, definition of "delamination".*

* cited by examiner

*Primary Examiner*—Kimberly S Smith
(74) *Attorney, Agent, or Firm*—Garvey, Smith, Nehrbass & North, L.L.C.; Gregory C. Smith

(57) ABSTRACT

A new and improved animal toenail sheath or cap, a method for its manufacture and various methods for securing said cap to an animal's toenail. The improved toenail cap utilizes a double dip polymeric manufacturing process to produce a layered cap, each layer being capable of having a different durometer, thickness or color than that of the adjacent layer. The cap may also contain a series of internal cleats to help secure the cap to the animal's toenail. Various adhesive methods, some of which are included in the manufacturing process, are also disclosed for adhering the nail cap to the animal's toenail.

15 Claims, 7 Drawing Sheets

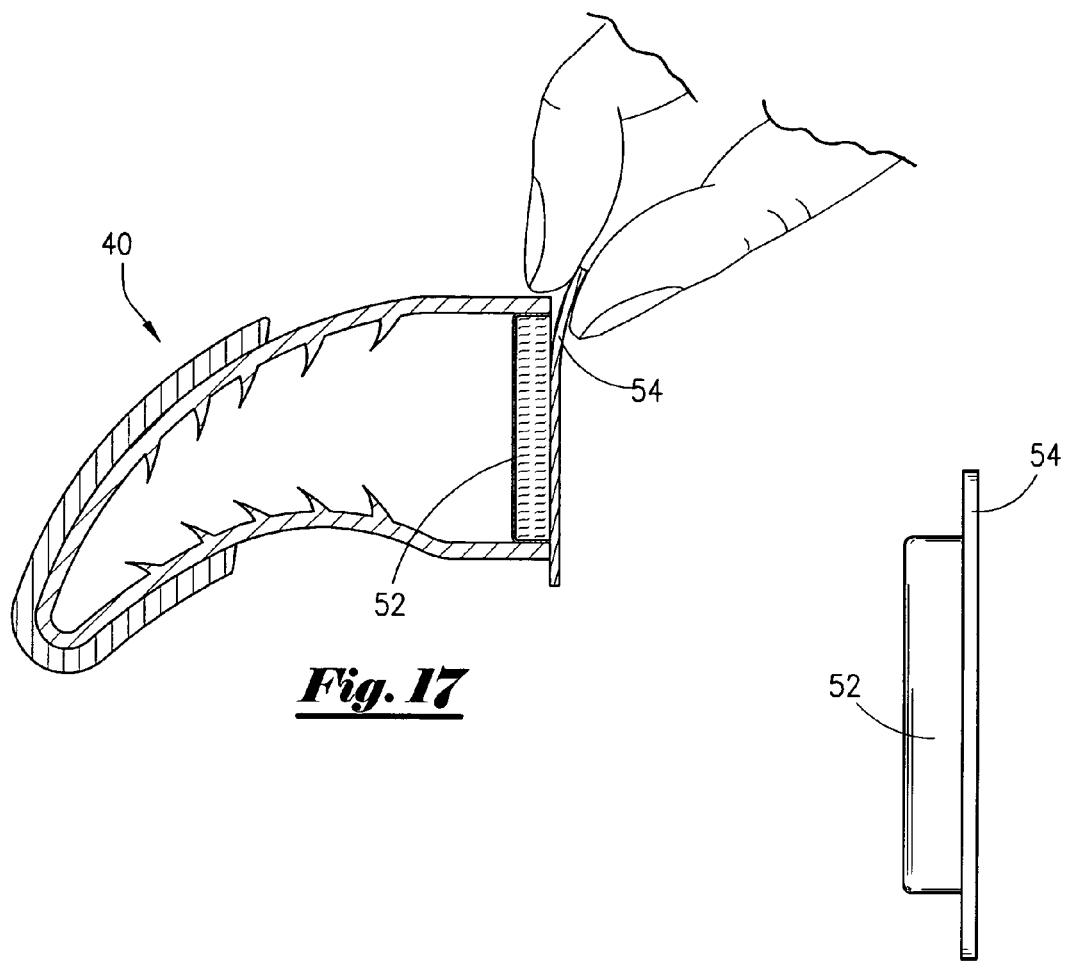
*Fig. 17*
*Fig. 19*
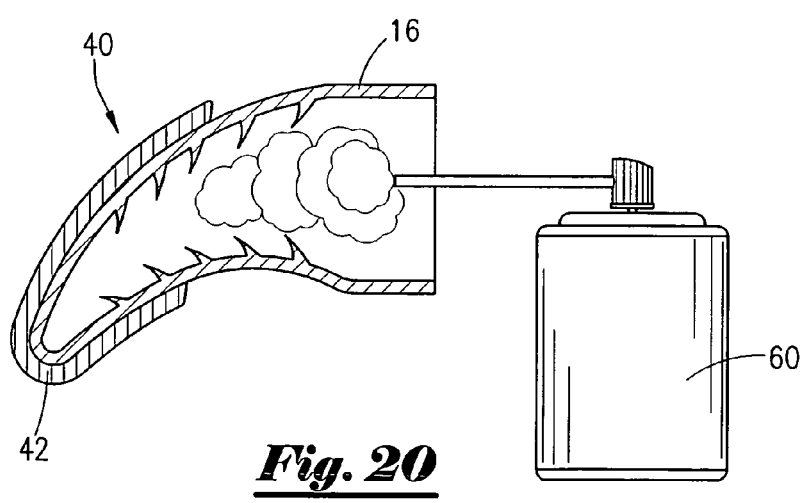
*Fig. 20*

ANIMAL TOE NAIL COVERING AND METHOD OF MANUFACTURE

CROSS REFERENCE TO RELATED APPLICATIONS

This application relates to my previous U.S. Pat. No. 4,962,731 the entire contents of which are incorporated herein by reference.

FIELD OF THE INVENTION

This invention relates generally to protective polymeric sheathing for animal toenails and more particularly to the manufacture and adaptation of such polymeric sheathings to the animal's nails.

GENERAL BACKGROUND

The protective toenail caps, covers or nail polymeric sheaths, previously disclosed in U.S. Pat. No. 4,962,731, are very small polymeric caps configured to the general shape of an animal's toenail particularly those of cats and dogs. The flexibility and resilience of the cap's construction material being such that deformation of the cap upon application to the animal's toenail provides a snug fit within limited ranges. It has been found that the most economical and applicable process and material for this application is a vinyl dip molding process developed especially for this process. Although other molding processes such as injection molding, blow molding etc. were investigated none proved to be as effective or as economical.

Over time, attempts to improve the durability of the cap have not been very successful as a result of an inability to increase durometer without sacrificing the deforming and reliance capability thus making the cap harder to fit a variety of toenail sizes.

In addition, use of an adhesive to secure the caps in place on the toenail has been a problem since inception. A method had to be conceived for inducing a fast bonding adhesive into the very narrow opening in the cap at the time of its application to the animal. This was achieve by developing a formulation of cyanoacrylate with a density that allowed the adhesive to flow into the narrow opening through a special flexible funnel fitted to the nozzle of a small adhesive container. Although frequent overflows occur due to inexperienced technicians, this method of adhesive insertion into caps seems to be the most effective method to date. There is also the problem of premature adhesive curing in the containers before use and problems associated with nail cap removal from the animal's toe nail in some cases.

Various methods for controlling adhesive insertion and reducing the time required installing the cap on the animal's toenail have been researched. However, the manufacturing process as discussed above prevents the insertion of a cyanoacrylate adhesive, in its current state of development, during the manufacturing process. Any attempt to inject the nail caps with this type of adhesive failed due to pre-curing of the adhesive due to heat associated with the molding process. Any attempt to inject the nail caps after removal from the dip molding process proved to be labor intensive, thus making the process economically prohibitive. Any attempt to insert a frangible bead into the caps failed for the same reasons. Manually handling the caps one at a time is too expensive and robotic insertion also proved to be cost prohibitive.

At least one attempt has been made by others to solve the adhesion problem as disclosed by Gat in U.S. Pat. No. 6,659,047. Gat suggest that the adhesive be inserted during the manufacturing process by either injection, insertion of a breakable bead or by fusing two separate component parts one of which is designed to contain the adhesive. Gat fails to exhibit a firm grasp of the problems involved in the manufacturing process. Due to the very small size of the cap it is virtually impossible to perform the sequence suggested by Gat in any reasonably economical manner. Therefore, the search for an improved bonding method continues.

Continuing research efforts have shown promise with regard to the durability of the caps especially where the caps are applied to dogs. Unlike cat nail caps, dog nail caps remain on the dogs toenail two to three times longer than on cat's toenails. This is due to the stuffing effect of the cat's toenail. As a result of such long duration, dogs generally wear the tips off the cap long before the nail configuration changes sufficiently to loosen the nail cap.

There is therefore, a need for an improved animal nail cap having better durability especially for dogs and heavier animals that tend to walk on rough surfaces and the continuing need to solve the adhesion problems discuss above.

SUMMARY OF THE INVENTION

A new and improved animal toenail cap method of manufacture and methods for securing said cap to an animal's toenail. The improved toenail cap utilizes a double dip manufacturing process to produce a first and second layered cap. Each of the layers being capable of having a different durometer, thickness or color than that of the adjacent layer. The cap may also contain a series of internal cleats to help secure the cap to the animal's toenail. Various adhesive methods are also disclosed for adhering the nail cap to the animal's toenail.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 17 is a cross section view of the embodiment shown in FIG. 12 with an adhesive paste insert;

FIG. 19 is a side view of the adhesive paste deposit and removable film tab;

FIG. 20 is an illustration view of the embodiment shown in FIG. 12 showing and atomized adhesive application;

FIG. 12 with an atomized application of an adhesive activation component;

DETAILED DESCRIPTION OF THE PREFERRED EMBODIMENT

Figure 1:
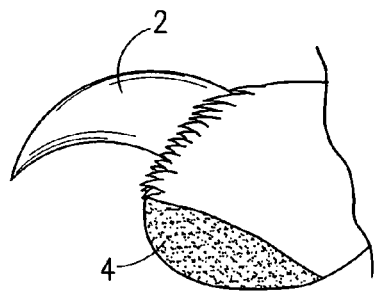
FIG. 1 is a side elevation view of a cat toe and nail configuration.
Figure 2:
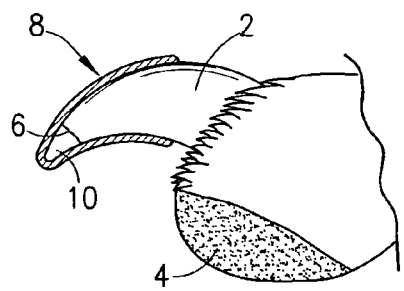
FIG. 2 is a side elevation view of the cat toe and nail configuration shown in FIG. 1 with nail clipped and toenail cap applied.

As seen in FIG. 1 a cat's toenail 2 is located on top of the animals toe pad 4 and thus not in contact with the walking surface unless extended by the muscles in the cat's foot. Further the nail is very sharp and kept in a sharpened state by the nail's fast growth and the shedding of a scale like polymeric sheath. Trimming the tip 6 of the nail 2 as shown in FIG. 2 prior to applying a polymeric sheath or nail cap 8 leaves a very small void 10 at the end of the cap 8. Since the nail 2 must be trimmed prior to applying the cap 8, any adhesive applied to the inside of the cap 8 is forced into the void 10 forming a bond between the cap 8 and the end of the nail tip 6. It is very difficult to apply the precise amount of adhesive to the inside of the cap to prevent excessive adhesive from being extruded from the cap 8 thereby causing the excessive adhesive to become matted in the animal's fur or preventing the cap from being seated properly. In any case as the cat's nails grows it takes only a few days for the polymeric sheath to decay and thus break the adhesive bond allowing the cap 8 to fall off the toe nail 2. It should be noted during this disclosure that the nail caps 8 are very small and difficult to handle. In some cases, forceps and tweezers are used during the application process. Generally, clean up with strong solvents is an essential part of the process.

Figure 3:
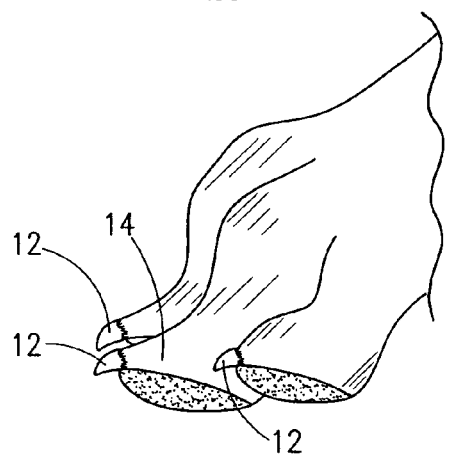
FIG. 3 is an isometric view of a dog foot.
Figure 4:
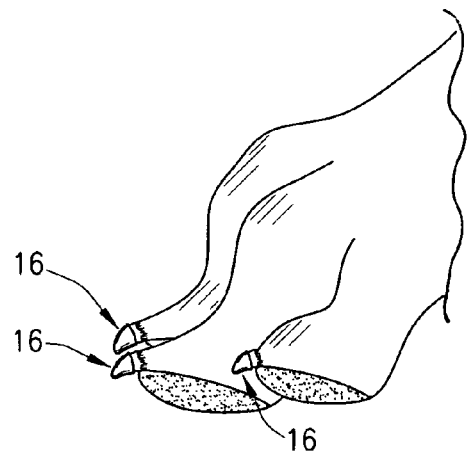
FIG. 4 is an isometric view of a dog foot with toenail caps applied.
Figure 5:
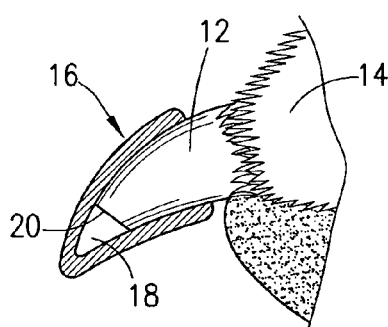
FIG. 5 is a close up view of the dog foot depicted in FIG. 4 depicting a cut-a-way view of the nail cap exposing the clipped nail as first applied.
Figure 6:
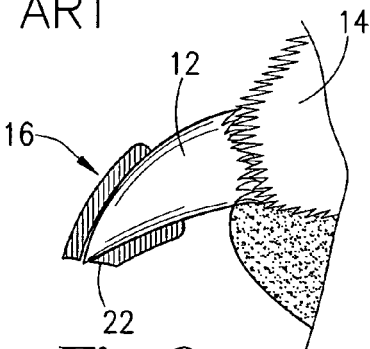
FIG. 6 is a close up view of the dog foot depicted in FIG. 4 depicting a cut-a-way view of the nail cap exposing the nail after nail regeneration and cap wear

Looking at FIG. 3, we see that dog's toenails 12 are arranged further forward of the toe 14 and are most often in contact with the walking surface. Nail caps or nail polymeric sheaths 16 as shown in FIG. 4 are easier to apply on dogs because their nails are generally larger than cat's nails and are more exposed beyond the animal's fur. As seen in FIG. 5 the dog's nails are clipped prior to application of a nail cap 16 thus leaving a void 18 between the toe nail 12 and the cap 16 in the same manner as that of the cat nail cap application discussed above with the same adhesive application problems. However, since the dog toenails do not have a scaly polymeric sheath, and the nail grows much slower, the cap remains in place much longer. As the nail grows from the base as seen in FIG. 6 the nail cap 16 is simply extended further forward from the toe and into contact with the walking surface. Since the cap 16 has now been in contact for quite some period of time, the cap tends to wear quite rapidly due to the void 18 seen in FIG. 5 lacking support. The cap 16 generally wears away until the tip 22 of the nail 12 grows out and begins to extend through the cap 16 and the configuration of the nail changes thereby breaking the adhesive bond. In many cases, the remnants of the cap 16 must be manually removed.

Figure 7:
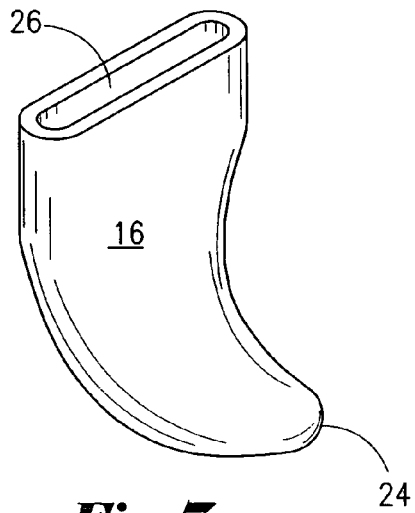
FIG. 7 is an isometric view of a prior art nail cap.
Figure 8:
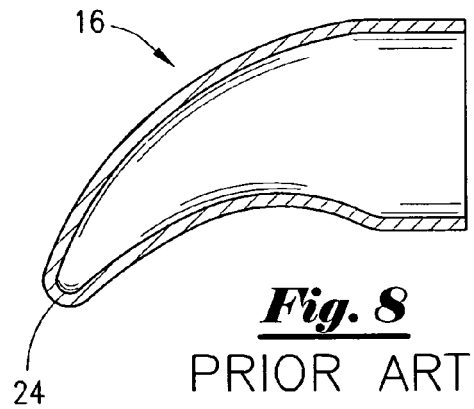
FIG. 8 is a cross section view of the prior art nail cap.

As shown in FIG. 7 the conventional animal nail cap 8,16 is a vinyl polymeric sheath with an external and internal shape generally consistent with that of an animal's toenail 2, 12 as further shown in FIG. 8 closed at one end 24 and having an elongated opening 26, best seen in FIG. 7, at the opposite end.

Figure 9:
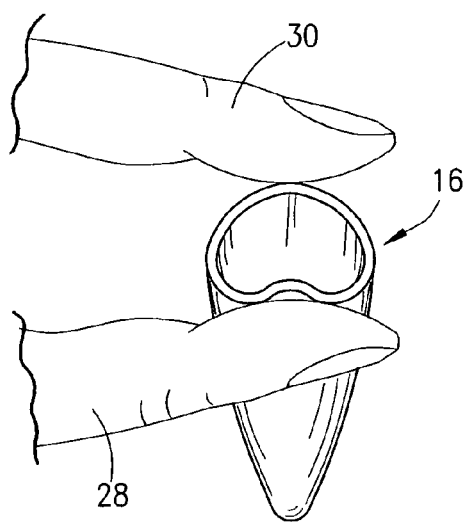
FIG. 9 is an illustrated view of how the nail cap is deformed for application to the animal's toenail.

The nail caps 8,16 are generally distorted thus enlarging the opening 26 by compression between a technician's thumb 28 and forefinger 30 on larger caps as illustrated in FIG. 9 or by other means such as clamps, forceps, tweezers etc. as necessary to help improve handling and the insertion of an adhesive spout or funnel dispenser therein and further assist in the application of the cap onto the animal's toenail 2, 12. As can be seen by FIG. 9 the insertion of an adhesive liquid is difficult enough but any attempt to break a frangible barrier or bead located within the cap with a blunted toenail would be even more difficult.

Figure 10:
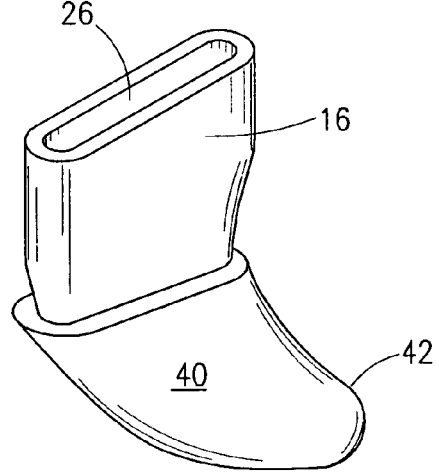
FIG. 10 is an isometric view of the preferred embodiment of the invention disclosed herein.
Figure 11:
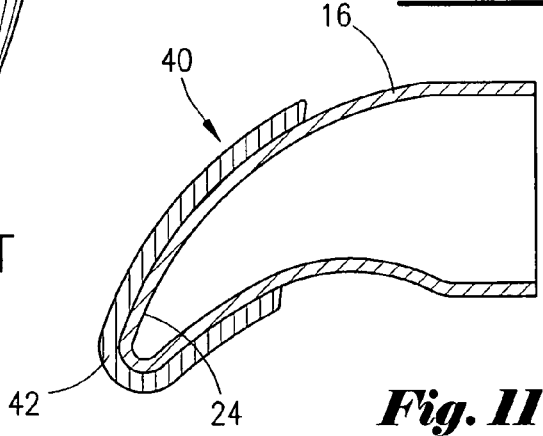
FIG. 11 is cross section view of the preferred embodiment shown in FIG. 10.

To address the problem of excessive wear involved with dog toenail caps a new nail cap 1 has been developed as seen in FIG. 10. The new nail cap 1 is a doubled layered polymeric sheath formed by a new double dip mold process. The process allows the initial polymeric sheath 16 to retain its original flexure, dimensions and color when applying a one or more dipped coatings 42 using different durometers, and colors. As seen in FIG. 11 the outer most layer or coating covers the tip 24 of the nail cap and extends approximately midway up the upper or spine of the nail cap and approximately one quarter of the way up the lower side of the cap. This process allows the opening 26 seen in FIG. 10 to remain flexible or be made even more flexible by reducing wall thickness of the first layer, while providing a tough durable wear resistant outer layer. This process allows for a wide range of economically acceptable materials to be used as well. New polymeric and formable metallic materials are currently being developed by the industry that may become beneficial for this application. Even liquid metal may become a reality in the not too distant future. The ability to multi-dip using different materials and two tone colors also enhances the aesthetic appearance of the nail caps. For example for feline nail caps 8 an iridescent base or high lighted glitter first layer can be used with a clear outer layer thus producing a deep high gloss protected color.

Turning now to the problem of securing the nail caps to the animal's toenail, we find that the definition of ADHESION is the attraction between dissimilar surfaces for one another, or the state in which two surfaces are held together by interfacial forces, which may consist of valence forces, interlocking action or both.

Figure 12:
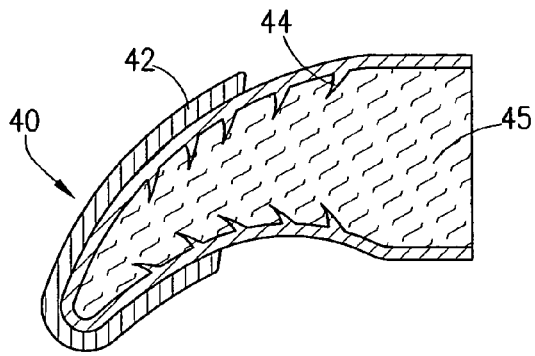
FIG. 12 is cross section view of the preferred embodiment shown in FIG. 10 with optional internal cleats.

Therefore, we have addressed the adhesion issue in the following ways:

One such means is shown in FIG. 12 wherein a series of internal cleats 44 are located along the upper and lower portions of the internal wall of the polymeric sheath or cap 40. These flexible internal cleats 44 are bent forwardly upon insertion of the animal's toenail thereby forming a resistive griping action against extraction. This type of cap using friction makes an adhesive unnecessary in some cases. Further, the addition of a textured surface 45 to the inner wall of the polymeric sheath or cap 40 as shown in FIG. 12 further increases the attraction between dissimilar surfaces for one another. This allows the use of an instrument to be dipped in an adhesive and inserted into the polymeric sheath 16, thus leaving an adhesive residue within the embossed surfaces when withdrawn. The residue remaining in the polymeric sheath 16 is sufficient for securing a fairly thin polymeric sheath 16, with a heavier external layer 42, to the animal's toenail 2,12.

Figure 13:
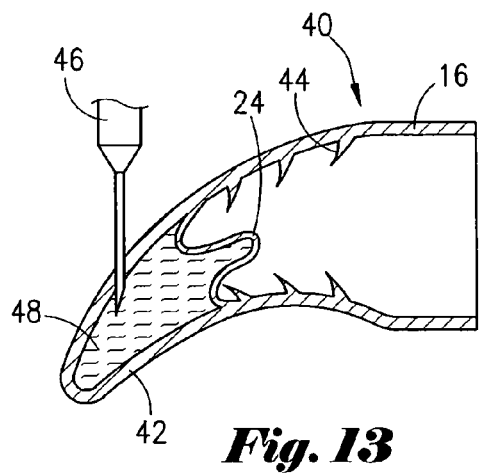
FIG. 13 is a cross section view of the embodiment shown in FIG. 12 illustrating a method for injection a fluid between layers.

Double-layered caps 40 open up the possibility of transforming a portion of the inner layer into a thin rupturable barrier containing a quantity of adhesive as seen in FIG. 13. This arrangement is a result of applying a release agent to the tip portion 24 of the cap prior to the application of the second dip layer 42 thus allowing separation or delaminating of the layers. A liquid adhesive may then be applied by inserting a needle 46, having a syringe filed with the liquid adhesive, between the two layers 24.42. The adhesive 48 forces the inner layer tip portion 24 to be expanded towards the opening of the cap, thus forming an encapsulated reservoir of adhesive 48. With the flexible tip portion 24 being formed, as a thin membrane the blunt clipped animal's toenail compresses the membrane upon entry causing a rupture allowing the adhesive to contact the nail.

Figure 14:
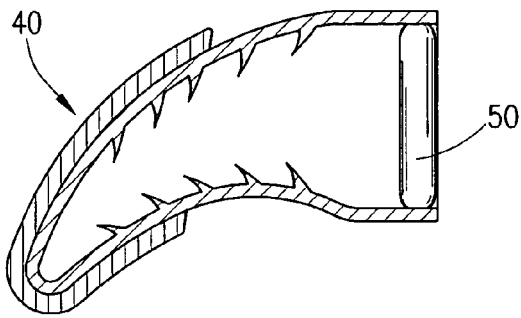
FIG. 14 is a cross section view of the embodiment shown in FIG. 12 with an adhesive gel-cap installed.
Figure 15:
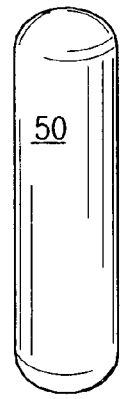
FIG. 15 is an isometric view of an adhesive gel-cap.
Figure 16:
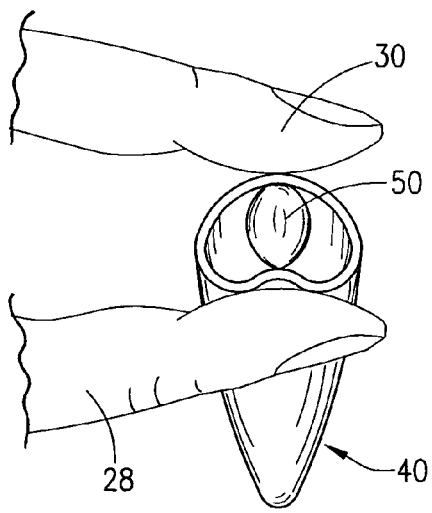
FIG. 16 is an illustration view of the gel cap being ruptured by deformation of the cap at application.

Another method for securing the nail caps to the animal's toenails, especially the smaller size caps, may be to insert a pliable gel cap 50 into the upper portion of opening 26 as shown in FIG. 14. This gel cap provides a flexible barrier in the opening 26 containing a semi-liquid material encased in a thin wax shell. The gel cap as shown in FIG. 15 may be an adhesive or an activation agent used to activate an inert adhesive component mixed with the polymeric material during manufacture. In either case, the liquid is encapsulated in a wax or otherwise deformable spreadable material. Prior to insertion of the animal's toenail the gel capsule 50 is ruptured or spread around the upper portion of the cap 40 by manipulation of the cap between the technician's thumb 28 and forefinger 30 as shown in FIG. 16.

Figure 18:
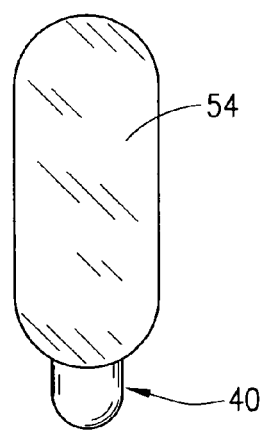
FIG. 18 is a top view of the cap and insert shown in FIG. 17 with removable film tab.

In lieu of the gel cap 50, an adhesive material may be inserted in the cap opening 26 seen in FIG. 10 in the manner shown in FIG. 17. In this case, an amount of adhesive paste 52 is deposited on a removable film tab 54 as shown in FIG. 18 and FIG. 19 conforming to the size and shape of the opening. Removal of the film tab 54 and manipulation of the cap as described in FIG. 16 spreads the paste 52 around the upper portion of the opening 26 thereby providing sufficient adhesion on smaller nail caps. Another method of providing adhesion between the nail cap and the animal's toenail is the process of providing an atomized spray adhesive 60 and simply spraying the adhesive within the nail cap 40 prior to application as shown in FIG. 20.

Figure 21:
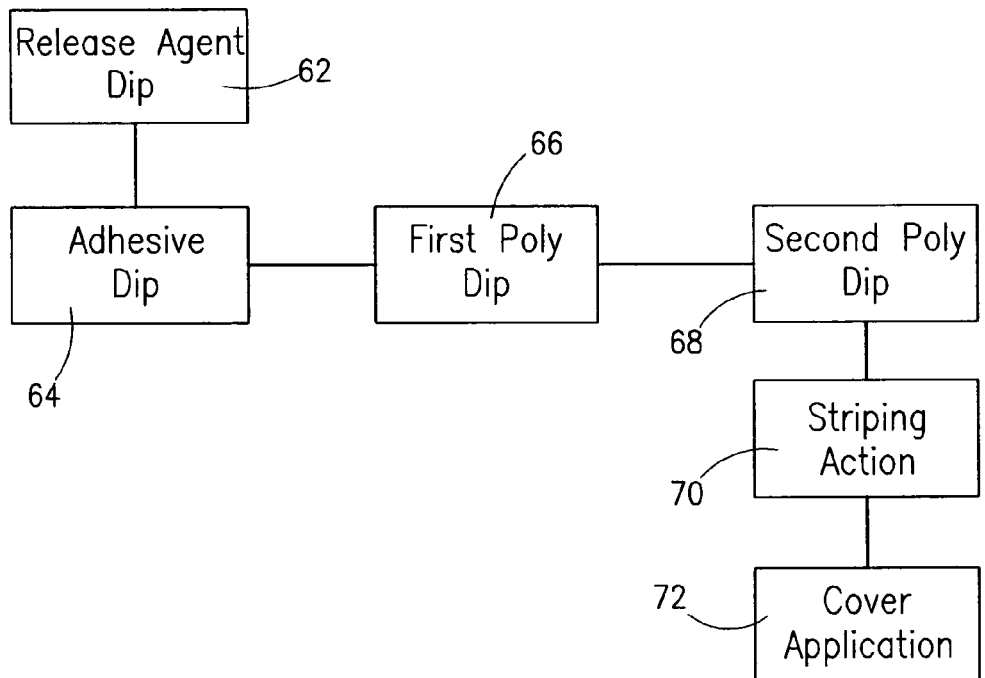
FIG. 21 is a block diagram of a process for applying an adhesive during the dip mold manufacturing process.

An adhesive may also be provided in the manufacturing process as diagramed in FIG. 21.

By first dipping, the mold mandrel in an adhesive release agent 62 before dipping into an adhesive material 64 the adhesive material 64 is thereby prevented from adhering to the mold mandrel, while allowing the adhesive material 64 to bond with the polymers in the first stage 66 of the dip process before being dipped in the second polymer and then stripped 70 from the mold's mandrels. To prevent the adhesive from curing an airtight seal 72 is provided by encapsulating the nail cap.

Figure 22:
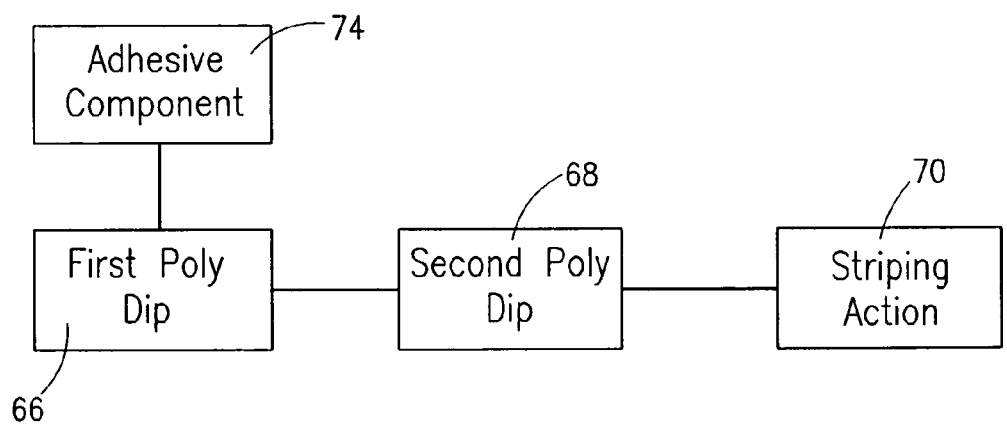
FIG. 22 is a block diagram of a process for applying an inert adhesive component to the polymeric material during the dip mold manufacturing process.

Yet another process, as diagramed in FIG. 22, for providing adhesion between the nail cap and the animal's toenail is the process of using a two-part adhesive. Adhesives in any form may be used especially various compositions utilizing one or more elements.

Figure 23:
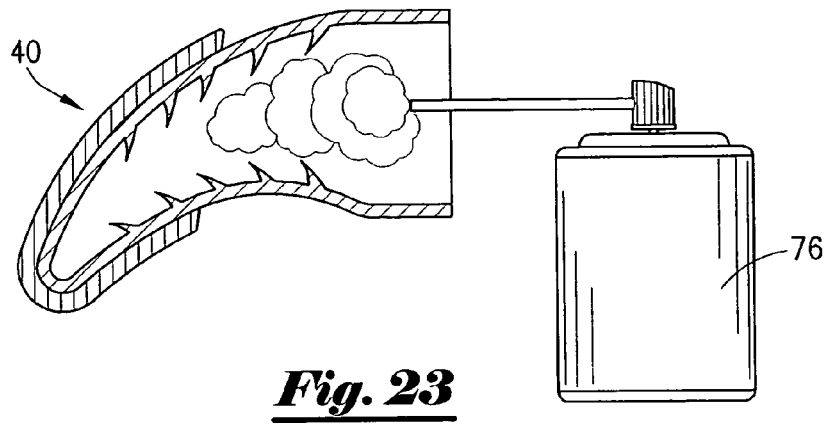
FIG. 23 is an illustration showing a cross section view of the embodiment shown

In this case, one component "A" 74 of a two component adhesive such as an epoxy is combined or otherwise applied to the first of the polymeric dip materials 66,68 before being stripped 70 from the mandrel. Subsequently, the "B" 76 component as shown in FIG. 23 is applied by aerosol spray to the inside of the nail cap thus combining with component "A" 74 to form an adhesive bond. Component "B" 76 may be applied directly to the animal's toenail 12 as seen in FIG. 24.

Figure 24:
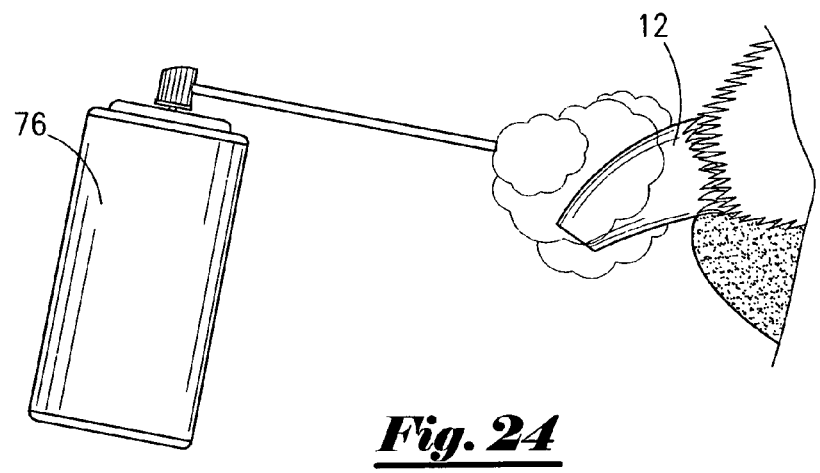
FIG. 24 is an illustration showing an atomized application of an adhesive activation component directly to a toenail prior to application of a nail cap containing the inert adhesive component described in FIG. 22.
Figure 25:
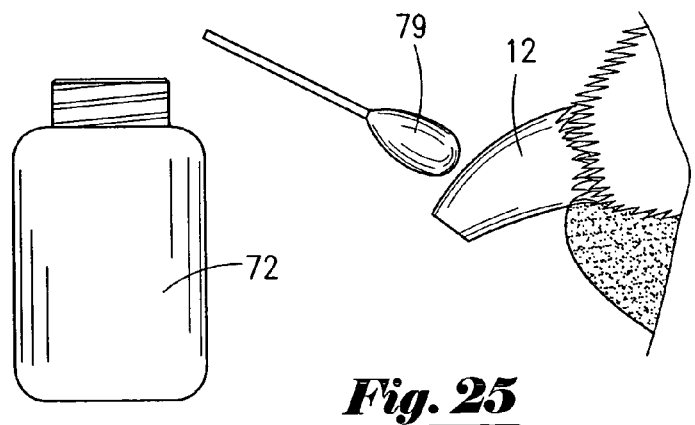
FIG. 25 is an illustration showing a swab application of an adhesive activation component directly to a toenail prior to application of a nail cap containing the inert adhesive component described in FIG. 22.

When an adhesive component is mixed in some manner with the polymeric material as diagramed in FIG. 22, a solvent, wetting agent or other liquefying activation agent 77 may be applied the toenail by spray as seen in FIG. 24 or swab 79 as indicted by FIG. 25.

Figure 26:
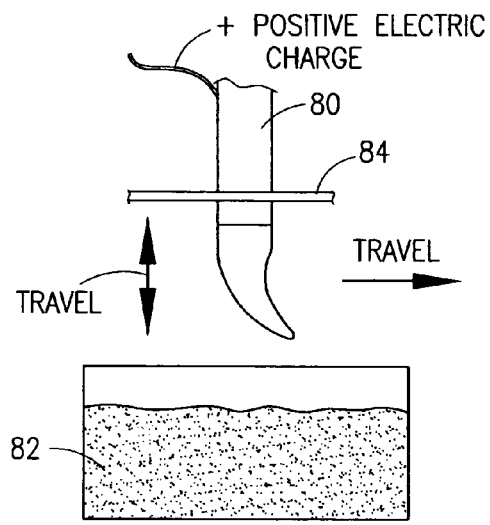
FIG. 26 is an illustration view of the dip mold mandrel adapted for electrical particle attraction of an adhesive powder as a first process step during the dip mold process as first step.
Figure 26A:
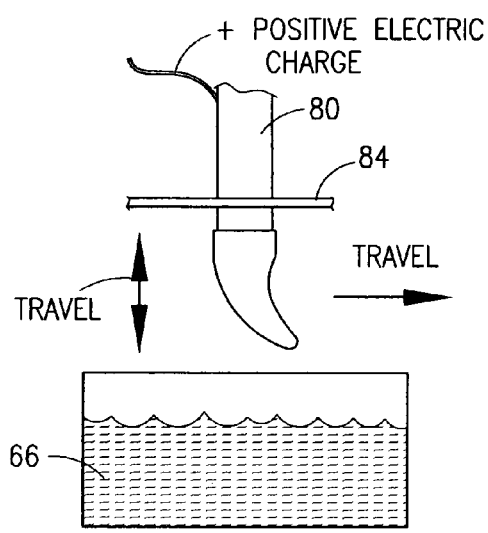
FIG. 26a is an illustration view of the dip mold mandrel adapted for electrical particle attraction of an adhesive powder as a first process step and the first poly dip step.
Figure 26B:
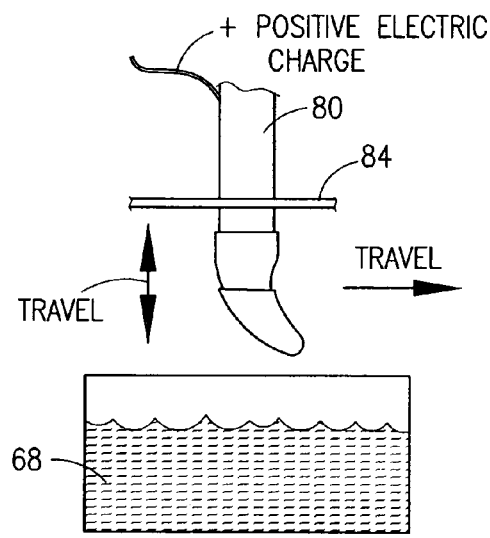
FIG. 26b is an illustration view of the dip mold mandrel adapted for electrical particle attraction of an adhesive powder as a first process step and the second poly dip step.
Figure 26C:
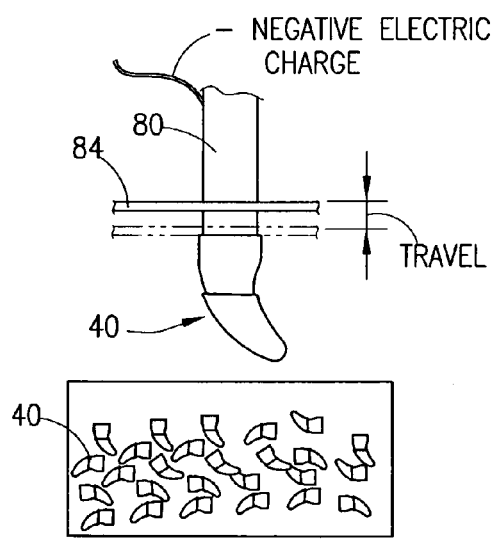
FIG. 26c is an illustration view of the dip mold mandrel adapted for electrical particle attraction of an adhesive powder as a first process step and the stripping step.

Still another adhesive application process may be achieved by positively charging the dip mandrels 80 so as to provide an electrostatic charge before dipping the mandrels into an adhesive powder 82 as shown in FIG. 26 before dipping the mandrel in the first and second polymeric materials shown in FIGS. 26a and 26b. After the polymeric materials have cured on the mandrels a reverse charge is passed through the mandrel prior to activation of the stripper 84 thus releasing the electrostatic charge and repelling the adhesive powder as the cap is being pealed from the mandrel as shown in FIG. 26c. The powder coating within the polymeric sheath may then be activated by spraying a liquefying or wetting agent within the polymeric sheath or directly to the toenail itself.

It is further anticipated that a bond between the nail cap and the animal's toenail may be achieved by using ultraviolet, ultrasonic or infrared techniques.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. An animal toenail covering having an opening at one end and an internal and external shape defining a pliable polymeric sheath generally consistent with that of an animal's toenail, said polymeric sheath comprising:

internal anticline cleats and an external coating of polymer encompassing at least a portion of said polymeric sheath.

2. The animal toenail covering according to claim 1 wherein said external coating of polymer has a hardness greater than that of said polymeric sheath.

3. The animal toe nail covering according to claim 1 wherein said polymeric sheath and said external coating of polymer are different colors.

4. The animal toenail covering according to claim 1 wherein said polymeric sheath further comprises a partial delamination between said polymeric sheath and a portion of said external coating of polymer.

5. The animal toenail covering according to claim 1 wherein said polymeric sheath further comprises at least an adhesive element.

6. The animal toenail covering according to claim 5 wherein said adhesive element is a liquid adhesive inserted between said polymeric sheath and said external coating of polymer.

7. The animal toenail covering according to claim 1 further comprising a textured inner wall surface.

8. The animal toenail covering according to claim 5 wherein said adhesive element is an adhesive powder.

9. The animal toenail covering according to claim 5 wherein said adhesive element is an aerosol.

10. The animal toenail covering according to claim 8 wherein said adhesive powder is applied to tooling used in a dip molding process for forming said polymeric sheath.

11. The animal toenail covering according to claim 10 wherein said adhesive powder is applied to said tooling by electrostatic means.

12. A polymeric animal toenail covering having an internal cavity and an external shape defining a pliable sheath generally consistent with that of an animal toenail for incasing an animal toenail said sheath comprising:

a plurality of pliable anticline cleats located within said internal cavity protruding inwardly and an external coating of polymer encompassing at least a portion of said sheath.

13. The polymeric animal toenail covering according to claim 12 wherein said external coating has a greater hardness than said covering.

14. The polymeric animal toenail covering according to claim 12 wherein said coating is a different color than said sheath.

15. The polymeric animal toenail covering according to claim 12 wherein said coating is applied to said sheath in manner whereby a void is formed between said coating and a portion of said sheath.

\* \* \* \* \*